United States Patent [19]
Kennedy

[11] 3,795,389
[45] Mar. 5, 1974

[54] TRUNNION SHAFT FLUID SUPPLY DEVICE
[75] Inventor: Frank Kennedy, Mt. Lebanon Township, Allegheny County, Pa.
[73] Assignee: United States Steel Corporation, Pittsburgh, Pa.
[22] Filed: June 16, 1972
[21] Appl. No.: 263,507

[52] U.S. Cl. .............................................. 266/36 P
[51] Int. Cl. ............................................... C21c 5/46
[58] Field of Search ............................. 266/36 P, 35

[56] References Cited
UNITED STATES PATENTS
2,333,654   11/1943   Lellep .................................. 266/35
2,641,461   6/1953    Lewis .................................. 266/36 P Primary Examiner—Gerald A. Dost
Attorney, Agent, or Firm—David S. Urey

[57] ABSTRACT

A fluid supply device for a hollow trunnion pin of a Q-BOP furnace is disclosed. The fluid supply device is insertable into the hollow trunnion pin and is operable to provide three fluid flow supply lines throughout the trunnion pin and the associated trunnion ring.

13 Claims, 7 Drawing Figures

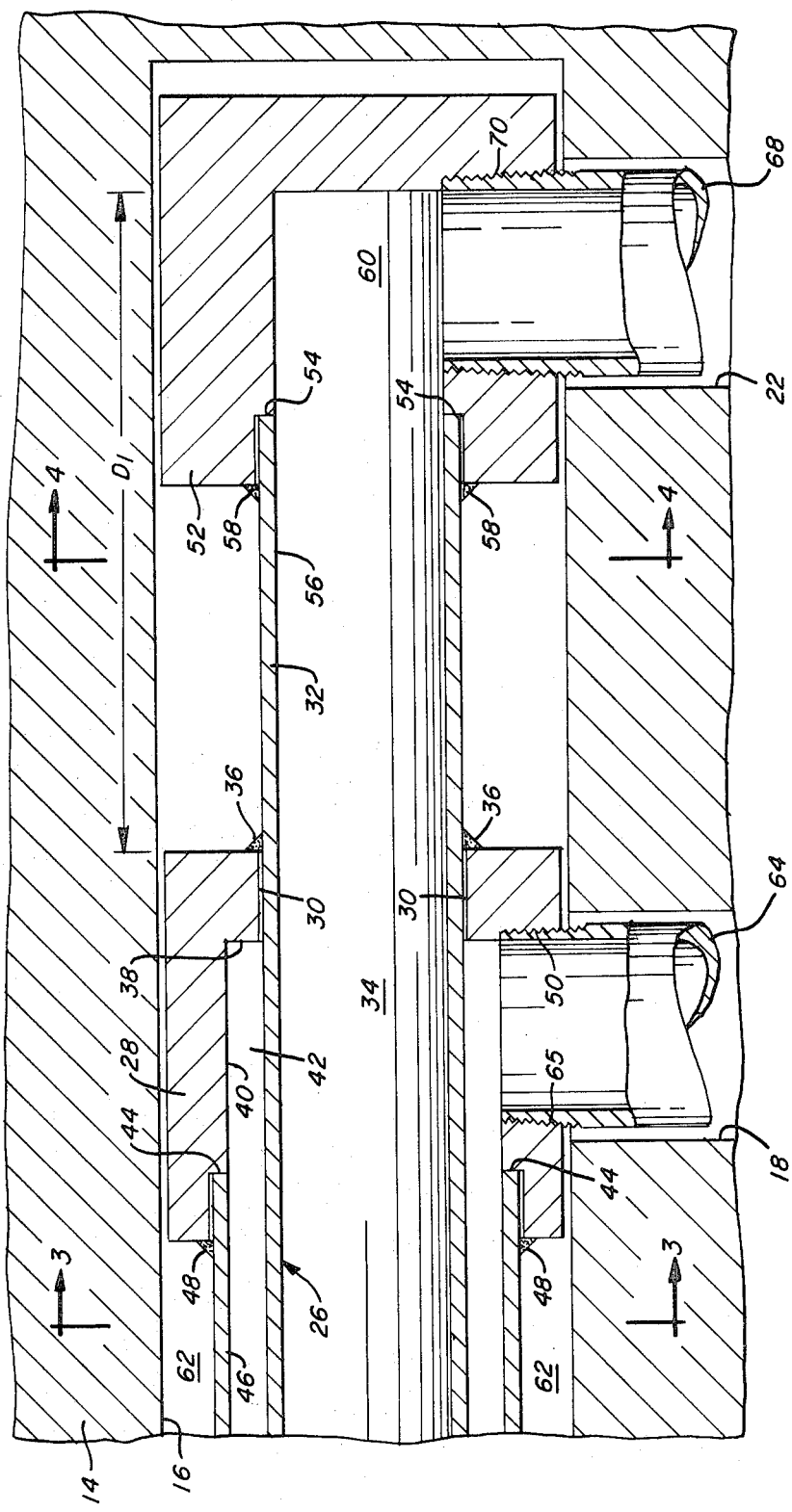

TRUNNION SHAFT FLUID SUPPLY DEVICE

BACKGROUND OF THE INVENTION

Heretofore, in order to provide a plurality of, such as three fluid, passages through a hollow trunnion pin associated with a trunnion ring for a Q-BOP furnace, such passages were provided by threading the inner end of the hollow drive pin from an extended distance, such as about 10' or the like, to provide a threadable connection for a central pipe and an outer threadable connection for a concentric larger pipe. These two pipes defined in conjunction with the hollow trunnion pin the desired three passages for example, a water-in passage, a water-out passage and a shroud gas passage through the trunnion pin and into the trunnion ring.

It will be appreciated that because of the great weight of the trunnion ring and the associated trunnion pins, i.e., the idle trunnion pin and the drive trunnion pin, it is essential that the fluid supply system be installed without the disassembly of, for example, the drive trunnion pin from the trunnion ring.

In addition, the threading of the inner portions of the hollow cavity in the trunnion pin is often difficult to align properly with the longitudinal axis of the hollow drive trunnion pin.

I am aware of the following prior art patents:

| U.S. Pat. No. | Inventor | Issued |
|---|---|---|
| 412,767 | Ludlow | 10/15/89 |
| 741,505 | Kirk | 10/13/03 |
| 757,803 | Burrow | 4/19/04 |
| 952,260 | Johnson | 3/15/10 |
| 1,711,738 | Madorsky | 5/7/29 |
| 1,992,999 | Frey | 3/5/35 |
| 2,578,872 | Work et al. | 12/18/51 |
| 2,599,158 | Brassert | 6/3/52 |
| 3,034,887 | Henne | 5/15/62 |
| 3,061,299 | Neuhaus et al. | 10/30/62 |
| 3,060,015 | Spolders et al. | 10/23/62 |
| 3,259,484 | Leroy et al. | 7/5/66 |

OBJECTS OF THE INVENTION

It is the general object of this invention to avoid and overcome the foregoing and other difficulties of and objections to prior art practices by the provision of an improved fluid supply device for a trunnion ring and an associated trunnion pin of, for example, a Q-BOP furnace, which fluid supply device:

a. is prefabricated outside the hollow drive or idle pin of the Q-BOP furnace;

b. provides three fluid passages through the idle or drive pin;

c. does not require disassembly of the drive or idle pin from the trunnion ring for installation;

d. is simple and rugged in construction;

e. provides a reliable leak-proof fluid supply system within the particular pin; and f. eliminates any tapping or threading of the particular pin prior to installation.

BRIEF SUMMARY OF THE INVENTION

The aforesaid objects of the invention, and other objects which will become apparent as the description proceeds, are achieved by providing an improved fluid supply device for a hollow trunnion pin of a Q-BOP furnace. The fluid supply device is insertable into the hollow trunnion pin and is operable to provide three fluid flow supply lines or passages through the trunnion pin and the associated trunnion ring.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIG. 2A is a fragmentary enlarged vertical sectional view similar to FIG. 2 showing the improved fluid supply device positioned within a longitudinal aperture in the drive trunnion pin and showing the fluid supply device extending through the drive trunnion pin into the trunnion ring to provide three fluid passages to such trunnion ring and showing, in addition, a fourth aperture in the drive trunnion pin extending through the drive trunnion pin to the atmosphere and communicating with one of the three fluid supply passages;

Although the principles of this invention are broadly applicable to oscillatable converter furnaces, Bessemer furnaces, or the like, this invention is particularly adapted for use in conjunction with a Q-BOP furnace, and hence it has been so illustrated and will be so described.

DETAILED DESCRIPTION

Figure 1:
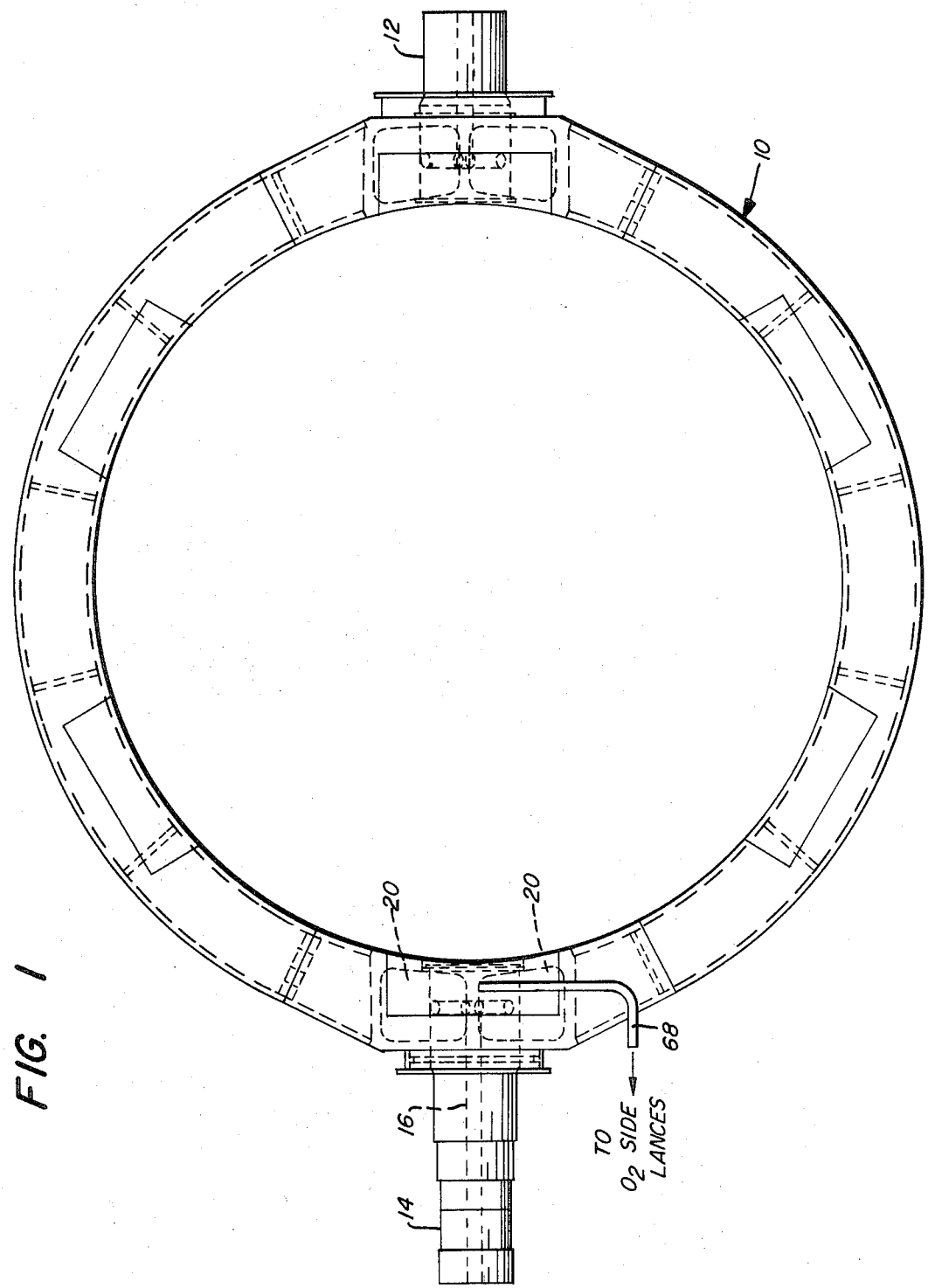
FIG. 1 is a plan view of a trunnion ring for a Q-BOP furnace, the short or idle trunnion pin and the long or drive trunnion pin associated with the trunnion ring to permit the oscillation of the trunnion ring and the Q-BOP furnace (not shown) on such trunnion pins.
Figure 2:
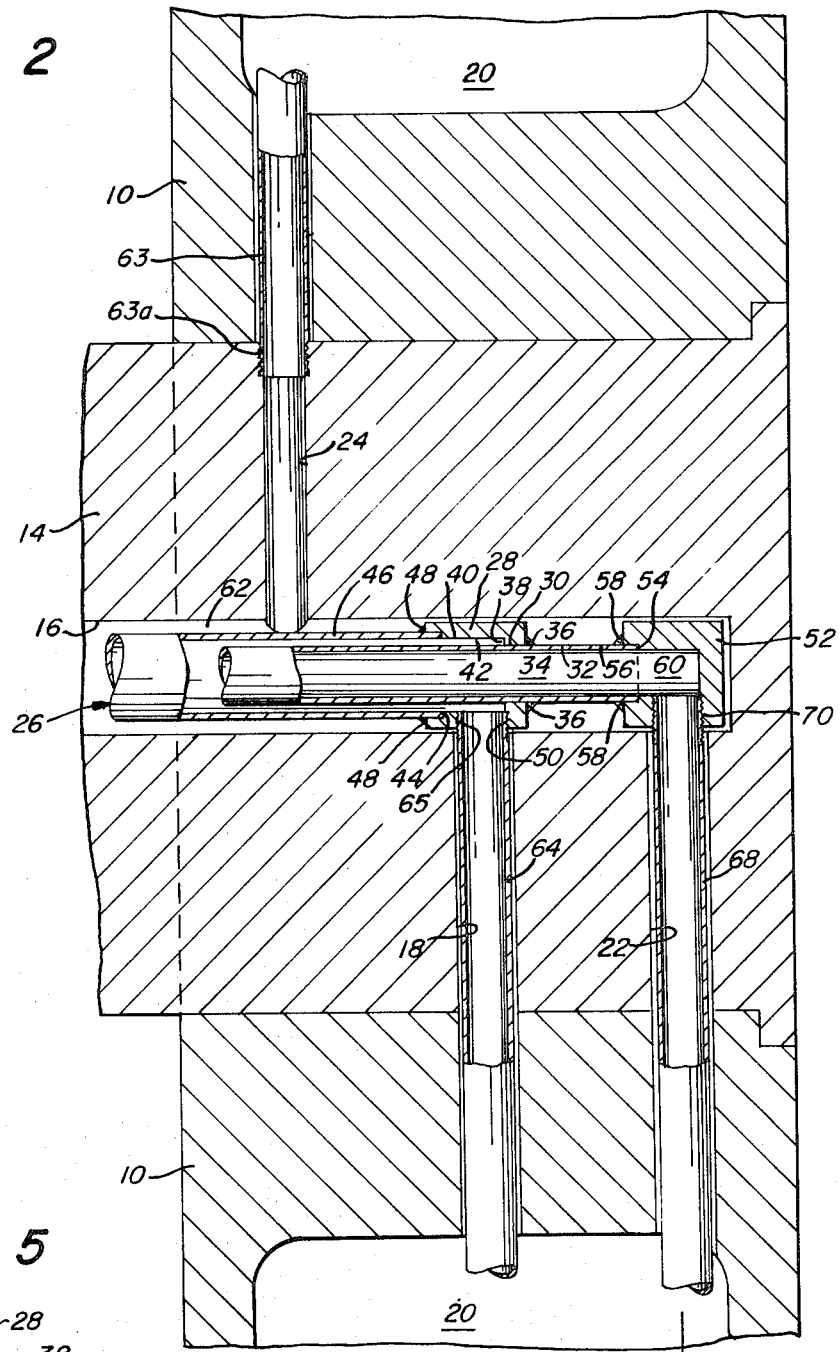
FIG. 2 is a fragmentary vertical sectional view of the improved fluid supply deivce and showing the hollow trunnion drive pin and the fluid supply device.
Figure 6:
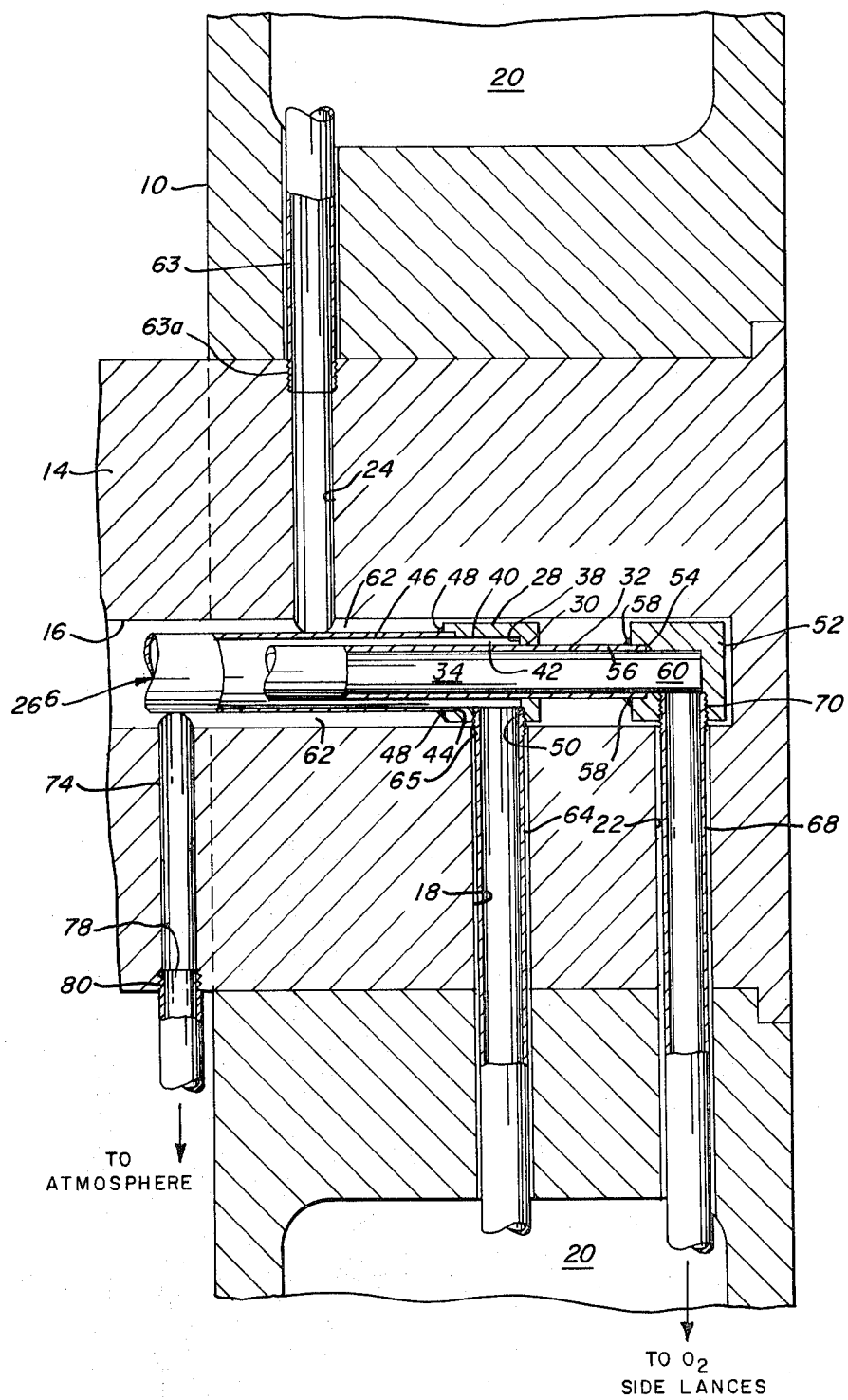
FIG. 6 is a view similar to FIG. 2 of an alternative embodiment of the fluid supply device.

With specific reference to the form of this invention illustrated in the drawings, and referring particularly to FIGS. 1, 2, 6, a trunnion ring 10 associated with a furnace such as a Q-BOP furnace (not shown) or the like is shown. A hollow short or idle trunnion pin 12 (FIG. 1) and a hollow long or drive trunnion pin 14 (FIGS. 1-4,6) extend into and from the trunnion ring 10.

One pin of the drive trunnion pin 14 and the idle trunnion pin 12, in this case the drive trunnion pin 14, is provided with a longitudinal aperture 16 (FIGS. 1-4,6) extending through the drive trunnion pin 14 into the trunnion ring 10. As shown in FIGS. 2, 2A, 3 and 6, the drive trunnion pin 14 is provided with a first aperture 18 (FIGS. 2,2A,3,6) communicating with the longitudinal aperture 16 in the drive trunnion pin 14 and extending through the drive trunnion pin 14 and the trunnion ring 10 as shown in FIG. 2, into a fluid cavity 20 (FIGS. 2,6) within the trunnion ring 10.

The drive trunnion pin 14 is also provided with a second aperture 22 (FIGS. 2,2A,3,6) communicating with the longitudinal aperture 16 in the drive trunnion pin 14 and extending through the drive trunnion pin 14 and the trunnion ring 10 in communication with the above mentioned fluid cavity 20. In addition, the drive trunnion pin 14 is provided with a third aperture 24 (FIGS. 2,6) communicating with the longitudinal aperture 16 in the trunnion drive pin 14 and extending through the drive trunnion pin 14 into the trunnion ring 10.

For the purpose of providing a plurality of fluid flow passages through the drive trunnion pin 14, and the associated trunnion ring 10, a fluid supply device 26 (FIGS. 2,2A) of the present invention is provided.

Fluid Supply Device 26

Figure 5:
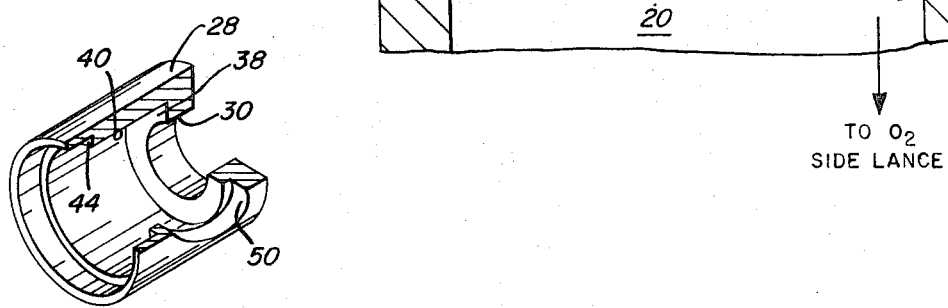
FIG. 5 is an isometric view of a T-member utilized in the improved fluid supply device.
Figure 4:
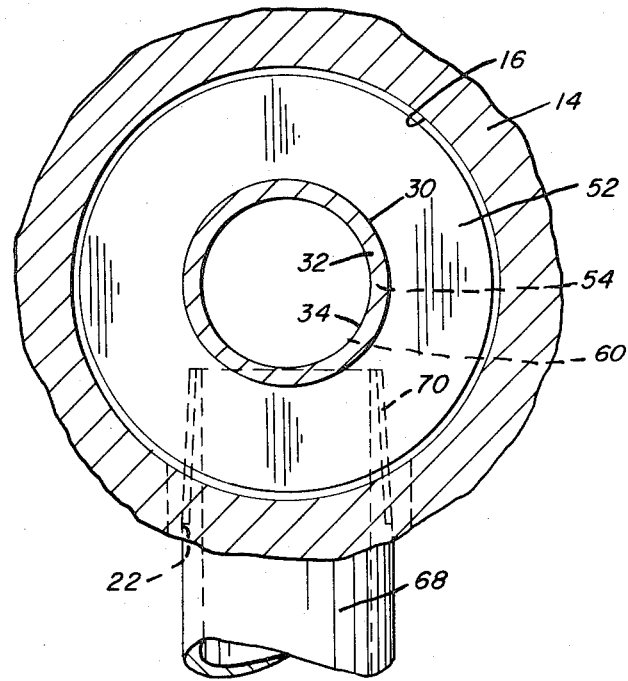
FIG. 4 is a similar vertical sectional view taken along the line 4—4 of FIG. 2A in the direction of the arrows.

The fluid supply device 26 has a T-member 28 (FIGS. 2,2A,3,5,6) which T-member 28 is reciprocable in the longitudinal aperture 16 in the drive trunnion pin 14 and is provided at its right hand end as shown in FIGS. 2,5,6 and with a central aperture 30 (FIGS. 2-6). A first pipe 32 (FIGS. 2-6) has a first fluid flow aperture 34 (FIGS. 2-6) and is adapted to pass through the central aperture 30 in the T-member 28 a predetermined distance D1 (FIG. 2A) to the predetermined position shown in FIGS. 2,2A with respect to the T-member 28. Means, such as welds 36 (FIGS. 2,2A) or the like, secure the first pipe 32 in fluid tight engagement to the T-member 28 in the predetermined position shown in FIGS. 2,2A. The T-member 28 has a first shoulder 38 (FIGS. 2,2A,3,5 and 6) adjacent the central aperture 30 in the T-member 28 and the flange portion 40 (FIGS. 2,2A,3,5,6) of the first shoulder 38 is adapted to define with the first pipe 32 a second fluid flow aperture 42 (FIGS. 2,2A,3 and 6).

Figure 3:
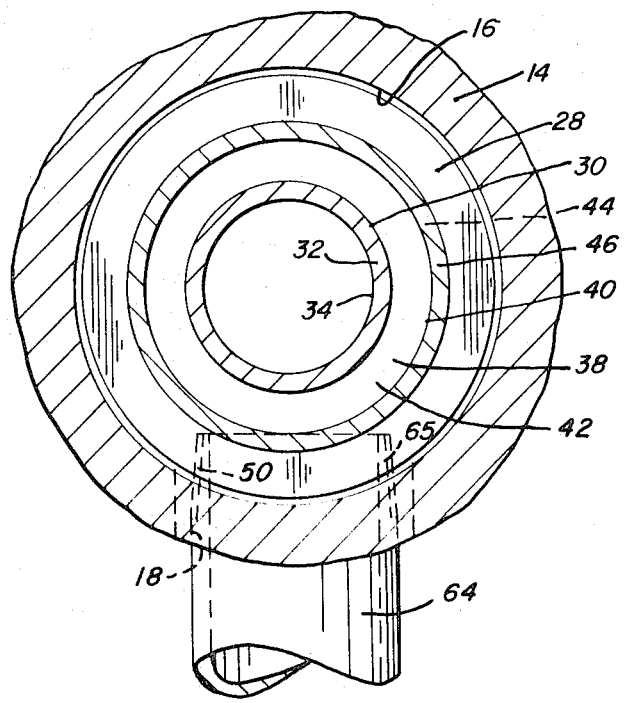
FIG. 3 is a vertical sectional view taken along the line 3—3 of FIG. 2A in the direction of the arrows.

In addition, the T-member 28 has a second shoulder 44 (FIGS. 2,2A,3,5,6) adjacent the flange portion 40 of the first shoulder 38. A second pipe 46 (FIGS. 2,2A,3,6) is adapted to engage the second shoulder 44 in the T-member 28 and to define with the first pipe 32 a continuation of the second fluid flow aperture 42 (FIGS. 2,2A,3). A second means, such as the welds 48 (FIGS. 2,2A,6) or the like, secure the second pipe 46 in fluid tight engagement against the second shoulder 44 of the T-member 28. As shown in FIGS. 2,2A,3, and 6, the T-member 28 is provided with an outlet aperture 50 in communication with the second fluid flow aperture 42 and extending through the wall of the T-member 28.

An elbow 52 (FIGS. 2,2A,4 and 6) is reciprocable in the longitudinal aperture 16 in the hollow trunnion drive pin 14 and has a third shoulder 54 on the left hand end as viewed in FIGS. 2 and 6 of the elbow 52 for receiving the free end 56 (FIGS. 2,2A,6) of the first pipe 32 against this third shoulder 54 of the elbow 52. A third means, such as the welds 58 (FIGS. 2,2A,6) or the like secures the free end 56 of the first pipe 32 in fluid tight engagement against the third shoulder 54 in the elbow 52. The elbow 52 is provided with a third fluid flow aperture 60 (FIGS. 2,2A,3,6) which aperture 60 registers with the first fluid flow aperture 34 in the first pipe 32 when the free end 56 of the first pipe 32 engages the third shoulder 54 in the elbow 52.

When the fluid supply device 26 is inserted into the longitudinal aperture 16 in the end drive trunnion pin 14, the outlet aperture 50 in the T-member 28 registers with the first aperture 18 in the drive trunnion pin 14 as shown in FIGS. 2 and 3. The third fluid flow aperture 60 in the elbow 52 registers with the second aperture 22 in the drive trunnion pin 14 and the second pipe 46 defines with the longitudinal aperture 18 in the drive trunnion pin 14 a fourth fluid flow aperture 62 (FIGS. 2,6) in communication with the third aperture 24 in the drive trunnion pin 14.

As shown in FIGS. 2,2A,3,and 6, a first conduit 64 is inserted in the first aperture 18 in the drive trunnion pin 14 in fluid tight engagement at 65 with the outlet aperture 50 in the T-member 28, to position the fluid supply device 26 in the longitudinal aperture 16 in the drive trunnion pin 14. The means utilized to secure the first conduit 64 in the fluid tight engagement with the outlet aperture 50 in the T-member 26 are threaded portions 65 on the outlet aperture 50 in the T-member 26 and the first conduit 64 respectively. As shown particularly in FIG. 2, the first conduit 64 extends through the drive trunnion pin 14 into the circulating cavity or fluid cavity 20 in the trunnion ring 10.

A second conduit 68 (FIGS. 2,2A,4,6) is inserted into the second aperture 22 in the drive trunnion pin 14 in similar fluid tight engagement at 70 with the third fluid flow aperture 60 in the elbow 52 to further insure the proper positioning of the fluid supply device 26 in the longitudinal aperture 16 in the drive trunnion pin 14. Threaded connections 70 (FIGS. 2,2A,3,6) on the outlet end of the third fluid flow aperture 62 in the elbow 52 and on the upper end of the second conduit 68 provide a threaded connection to insure the fluid tight engagement between the parts. As shown in FIG. 1, the second conduit 68 extends through the drive trunnion pin 14, the circulating cavity 20 in the trunnion ring 10, and through the side wall of the trunnion ring 10 to the atmosphere for connecting, for example, to oxygen side tuyeres (not shown).

In the preferred embodiment of the fluid supply device 26, a shroud gas, such as propane or the like, is introduced through the first fluid flow aperture 34 in the first pipe 32 and the third fluid flow aperture 60 in the elbow 52 and the second conduit 68 (as described above) and is then fed by means (not shown) for example, to a side tuyere (not shown) in the Q-BOP furnace (not shown). The second fluid flow aperture 42 defined by the first pipe 32, the flange portion 40 of the first shoulder 38 of the T-member 28 and the second pipe 46 may be utilized as shown in FIGS. 2 and 6 to conduct cooling water into the T-member 28, through the outlet aperture 50 in the T-member 28 and down the first conduit 64 into the circulating cavity 20 of the trunnion ring 10.

Also as shown in FIGS. 2,2A and 3, the cooling water may be returned from the trunnion ring 10 by means of the inlet or third aperture 24 in the drive trunnion pin 14 and a pipe 63 (secured to the drive trunnion pin 14 by threads 63a) and through the fourth fluid flow aperture 62 defined by the longitudinal aperture 16 in the drive trunnion pin 14 and the outside of the second pipe 46.

ALTERNATIVE EMBODIMENTS

It will be understood by those skilled in the art that alternatively in the device $26^6$ shown in FIG. 6, the drive trunnion pin 14 may be provided with a fourth aperture 74 extending from the fourth fluid flow aperture 62 through the drive trunnion pin 14 to the atmosphere where such fourth aperture 74 in the drive trunnion pin 14 may be connected to other means (not shown) for conveying the fluid contents of such fourth aperture 74 and an associated pipe 78 (secured by threads 80 to the drive trunnion pin 14) as desired.

It will also be understood by those skilled in the art that the first fluid flow aperture 34 in the first pipe 32 and the third fluid flow aperture 60 in the elbow 52, the second fluid flow aperture 42 between the first pipe 32 and the second pipe 46 and the fourth fluid flow aperture 62 between the second pipe 46 and the longitudinal aperture 16 alternatively may be utilized as desired to carry either a liquid or a gas into or out of the trunnion ring 10 and the drive trunnion pin 14.

Further, the fluid tight seals 65,70,63a,80 (FIGS. 2,2A,6) may be (in addition to a threaded connection) any one of the following: a seal weld, a TEFLON type tape on the threads by such connections, a packing gland (not shown), or the like. TEFLON is a tradename of E. I. du Pont de Nemours, Wilmington, Del., for a heat-resistant, abrasive-resistant plastic.

SUMMARY OF THE ACHIEVEMENTS OF THE OBJECTS OF THE INVENTION

It will be recognized by those skilled in the art that the objects of this invention have been achieved by providing an improved fluid supply device 26 (FIGS. 1–5-)and $26^6$ (FIG. 6) for a Q-BOP furnace (not shown) having a trunnion ring 10 (FIGS. 1,2,6) and associated trunnion pins 12 and 14 extending into and from the trunnion ring 10. Such improved fluid supply device 26 is prefabricated outside the particular trunnion pin, either the idler trunnion pin 12 or the drive trunnion pin 14 of the Q-BOP furnace (not shown); provides a plurality of fluid passages 34,42 and 62,and 60 through the associated trunnion pin, in this case, the drive trunnion pin 14; does not require disassembly of the idle trunnion pin 12 or the drive trunnion pin 14 from the trunnion ring 10 for installation; is simple and rugged in construction; provides a reliable leak-proof fluid supply system within the particular hollow pin, either the idle trunnion pin 12 or the drive trunnion pin 14; and eliminates any tapping or threading of the particular hollow pin, either the idle trunnion pin 12 or the drive trunnion pin 14 prior to installation of the devices 26 or $26^6$.

While in accordance with the patent statutes, preferred and alternative embodiments of this invention have been illustrated and described in detail, it is to be particularly understood that the invention is not limited thereto or thereby.

I claim:

1. For a furnace having a trunnion ring and trunnion pins extending into and from said trunnion ring, one pine of said trunnion pins provided with a longitudinal aperture extending through said one pin into said trunnion ring, said one pin being provided with a first aperture communicating with said longitudinal aperture in said one pin and extending through said one pin into said trunnion ring, also being provided with a second aperture communicating with said longitudinal aperture in said one pin and extending into said trunnion ring and also being provided with a third aperture communicating with said longitudinal aperture in said one pin and extending through said one pin into said trunnion ring, a fluid supply device having:
   a. a T-member reciprocable in said longitudinal aperture in said one pin and provided at one end with a central aperture;
   b. a first pipe having a first fluid flow aperture and adapted to pass through said central aperture in said T-member a predetermined distance to a predetermined position with respect to said T-member;
   c. means for securing said first pipe in fluid tight engagement to said T-member in said predetermined position;
   d. said T-member also having a first shoulder adjacent said central aperture in said T-member, said first shoulder being adapted to define with said first pipe a second fluid flow aperture;
   e. said T-member also having a second shoulder adjacent said first shoulder;
   f. a second pipe adapted to engage said second shoulder in said T-member and to define with said first pipe a continuation of said second fluid flow aperture;
   g. a second means for securing said second pipe in fluid tight engagement against said second shoulder in said T-member;
   h. said T-member being provided with an outlet aperture in communication with said second fluid flow aperture and extending through said T-member;
   i. an elbow reciprocable in said longitudinal aperture in said one pin and having a third shoulder on one end of said elbow and to receive the free end of said first pipe against said third shoulder of said elbow;
   j. a third means for securing said free end of said first pipe in fluid tight engagement against said third shoulder in said elbow;
   k. said elbow being provided with a third fluid flow aperture which registers with said first fluid flow aperture in said first pipe when said free end of said first pipe engages said third shoulder in said elbow;
   l. said fluid supply device being insertable into said longitudinal aperture in said one pin so that:
      1. said outlet aperture in said T-member registers with said first aperture in said one pin,
      2. said third fluid flow aperture in said elbow registers with said second aperture in said one pin, and
      3. said second pipe defines with said longitudinal aperture in said one pin a fourth fluid flow aperture in communication with said third aperture in said one pin.

2. In combination:
   a. a trunnion ring for a furnace;
   b. trunnion pins extending into and from said trunnion ring;
   c. one pin of said trunnion pins being provided with a longitudinal aperture extending into said trunnion ring;
   d. said one pin being provided with a first aperture in communication with said longitudinal aperture in said one pin and extending through said one pin into said trunnion ring, also being provided with a second aperture communicating with said longitudinal aperture in said one pin and extending into said trunnion ring and also being provided with a third aperture communicating with said longitudinal aperture in said one pin and extending through said one pin into said trunnion ring;
   e. a fluid supply device having:
      1. A T-member reciprocable in said longitudinal aperture in said one pin and provided at one end with a central aperture;
      2. a first pipe having a first fluid flow aperture and adapted to pass through said central aperture in said T-member a predetermined distance to a predetermined position with respect to said T-member;
3. means for securing said first pipe in fluid tight engagement to said T-member in said predetermined position;
4. said T-member also having a first shoulder adjacent said central aperture in said T-member, said first shoulder being adapted to define with said first pipe a second fluid flow aperture;
5. said T-member also having a second shoulder adjacent said first shoulder;
6. a second pipe adapted to engage said second shoulder in said T-member and to define with said first pipe a continuation of said second fluid flow aperture;
7. a second means for securing said second pipe in fluid tight engagement against said second shoulder in said T-member;
8. said T-member being provided with an outlet aperture in communication with said second fluid flow aperture and extending through said T-member;
9. an elbow also reciprocable in said longitudinal aperture in said one pin and having a third shoulder on one end of said elbow and to receive the free end of said first pipe against said third shoulder of said elbow;
10. a third means for securing said free end of said first pipe in fluid tight engagement against said third shoulder in said elbow;
11. said elbow being provided with a third fluid flow aperture which registers with said first fluid flow aperture in said first pipe when said free end of said first pipe engages said third shoulder in said elbow;
12. said fluid supply device being insertable into said longitudinal aperture in said one pin so that:
    a. said outlet aperture in said T-member registers with said first aperture in said one pin,
    b. said third fluid flow aperture in said elbow registers with said second aperture in said one pin, and
    c. said second pipe defines with said longitudinal aperture in said one pin a fourth fluid flow aperture in communication with said third aperture in said one pin.

3. The combination recited in claim 2 wherein said trunnion ring is provided with a fluid cavity in communication with one aperture in said one pin of said first aperture in said one pin and said second aperture in said one pin.

4. The combination recited in claim 2 wherein one aperture in said one pin of said first aperture in said one pin and said second aperture in said one pin extends through said trunnion ring to the atmosphere.

5. The combination recited in claim 2 and having a first conduit in said first aperture in said one pin in fluid tight engagement with said outlet aperture in said T-member to position said fluid supply device in said longitudinal aperture in said one pin.

6. The combination recited in claim 2 and having a second conduit in said second aperture in said one pin in fluid tight engagement with said third fluid flow aperture in said elbow to position said fluid supply device in said longitudinal aperture in said one pin.

7. The combination recited in claim 3 wherein said one aperture in said one pin carries a cooling fluid.

8. The combination recited in claim 2 wherein said third aperture in said one pin carries a cooling fluid.

9. The combination recited in claim 2 wherein said first fluid flow aperture in said first pipe carries a gaseous fluid.

10. The combination recited in claim 2 wherein said one pin is provided with a fourth aperture which extends through said one pin to the atmosphere.

11. The combination recited in claim 2 wherein said first aperture in said one pin extends through said one pin to the atmosphere.

12. The combination recited in claim 2 wherein said second aperture in said one pin extends through said one pin to the atmosphere.

13. The combination recited in claim 2 wherein said third aperture in said one pin extends through said one pin to the atmosphere.

* * * * *